G. I. KESTER.
PHOTOGRAPHIC CAMERA.
APPLICATION FILED NOV. 18, 1918.
1,291,920.
Patented Jan. 21, 1919.
3 SHEETS—SHEET 3.
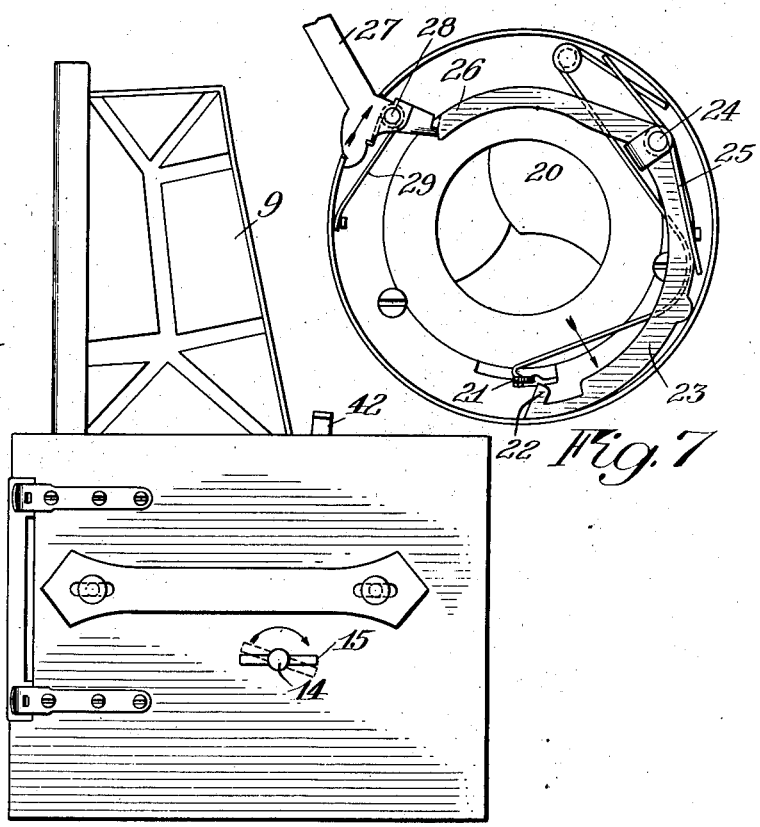
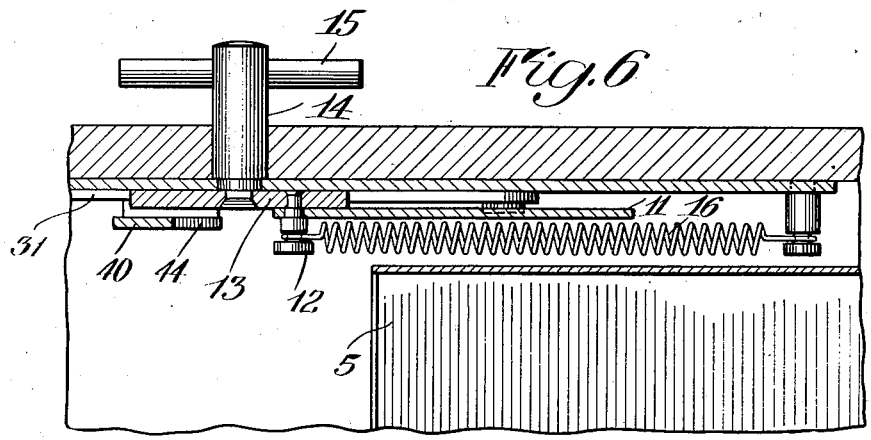
INVENTOR
George I. Kester
BY
his ATTORNEYS

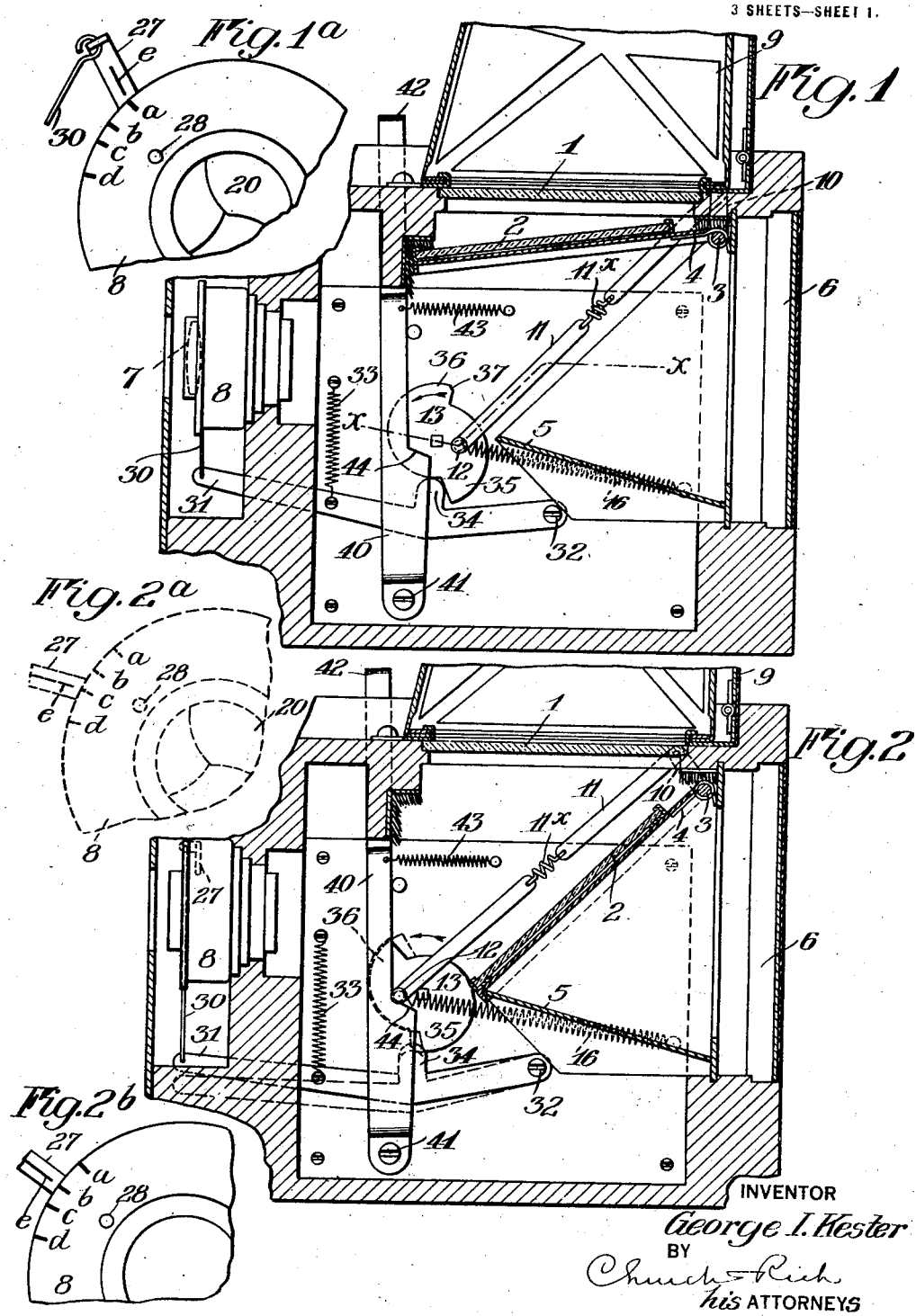

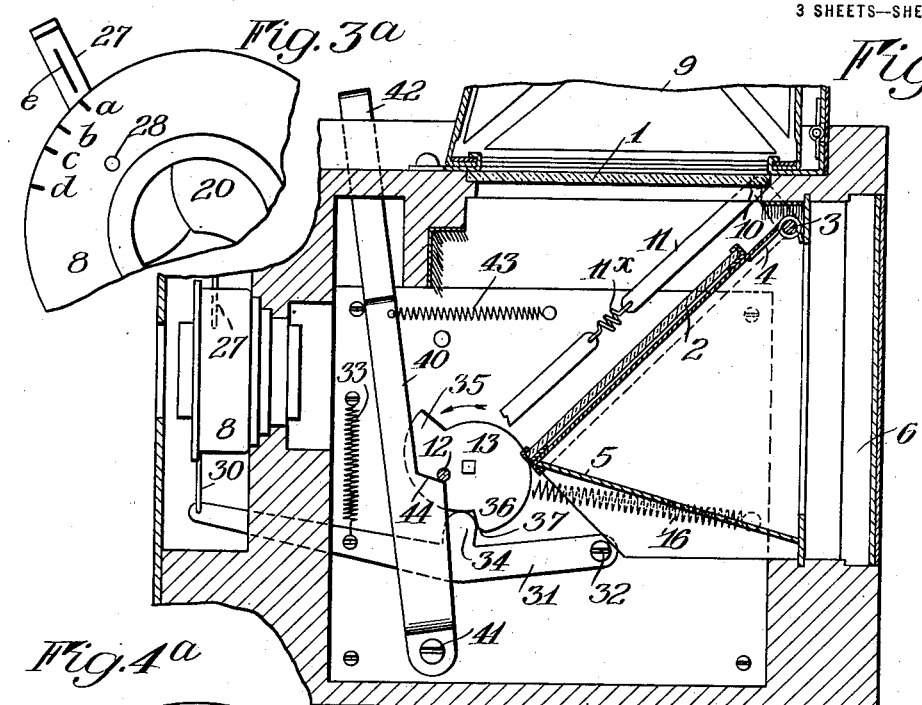

UNITED STATES PATENT OFFICE.

GEORGE I. KESTER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC CAMERA.

1,291,920.   Specification of Letters Patent.   Patented Jan. 21, 1919.

Application filed November 18, 1918. Serial No. 262,977.

*To all whom it may concern:*

Be it known that I, GEORGE I. KESTER, of Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and to the reference-numerals marked thereon.

My present invention relates to photographic cameras of the reflecting type employing a movable mirror, a focusing screen and a photographic shutter coördinated therewith in such manner that the object to be photographed may be viewed and focused by the operator and the shutter closed and operated to make the exposure. A camera possessing these general characteristics is shown in Letters Patent No. 1,279,164, granted September 17, 1918, to the Eastman Kodak Company, and my present invention has for its object the adaptation to a camera having this general mode of operation of a spring operated exposing shutter of the type in which, under normal circumstances, the shutter is set and released by a continuous movement in one direction of a setting and controlling member, the construction being such that a slight return or retrograde movement of the member is required in order to retain the shutter in open position during the focusing operation. A shutter of this type is shown in the patent to Eastman Kodak Company, No. 946,679, granted January 18, 1910, but my invention is capable of use with other shutters having this general mode of operation. The invention further consists in a simple and improved mechanism for accomplishing the above result and to these and other ends the invention resides in certain improvements and combinations of parts, all as will be hereinafter more fully described, the novel features being pointed out in the claims at the end of the specification.

In the drawings:

Figure 1 is a longitudinal sectional view of a camera embodying my improvements, with the parts in normal or inoperative position, with the shutter closed and the focusing screen covered;

Fig. 1ª is a front view of a portion of the shutter showing the position of the shutter actuating and controlling lever;

Fig. 2 is a similar view showing the parts in focusing position in full lines and in dotted lines an intermediate position;

Fig. 2ª shows in dotted lines the position of the shutter actuating and controlling member when the parts are in the position shown in dotted lines in Fig. 2;

Fig. 2ᵇ is a fragmentary view of a portion of the front of the shutter showing the position of the operating and controlling lever when the parts are in the position shown in full lines in Fig. 2;

Fig. 3 is a longitudinal sectional view of the camera, similar to Fig. 1, showing the position of the parts just before the exposure is made and with the focusing mirror about to rise;

Fig. 3ª is a fragmentary view showing the position of the shutter actuating and controlling lever when the parts are as shown in Fig. 3;

Fig. 4 is a view similar to Fig. 3, showing the parts when the exposure is being made;

Fig. 4ª is a fragmentary view of the shutter showing the position of the actuating and controlling lever;

Fig. 5 is a side elevation of the camera;

Fig. 6 is a sectional view on the line *x—x* of Fig. 1;

Fig. 7 is an outline view of the essential parts of the type of shutter to which the present mechanism is adapted.

Similar reference numerals throughout the several views indicate the same parts.

My improvements are shown, in the present instance, in connection with a reflex box camera of the lens focusing type having an opening in the upper portion covered with a ground glass or focusing screen 1, a swinging mirror 2 pivoted at 3 and operated or assisted in its upward movement by a spring 4 encircling its pivot. The mirror when swung to its lowermost position, as shown in Fig. 2, coöperates with a septum 5 and covers the sensitized material located at or near the rear chamber 6, said mirror reflecting the image from the lens 7 in the shutter casing 8, upwardly upon the ground glass so that it may be viewed through the usual hood 9 as in cameras of this general type. The shaft of the mirror is provided with an arm 10 connected by a link 11 having an intermediate spring 11ˣ with a wrist pin 12 mounted upon or secured to a cam plate 13 provided with an operating arbor 14 and a manipulating handle 15, as shown particularly in Fig. 6. 16 indicates a spring connected at its forward end to the cam plate and preferably to the wrist pin 12 thereon, operating to turn the cam plate and arbor through a portion of its revolution after the wrist pin crosses the center of rotation as will be understood. The spring 11ˣ permits a slight elongation of the link 11 when the wrist pin is crossing the center of rotation so that the spring 16 may operate below the center to complete the operation of the mirror. The rotation of the cam plate and arbor in the direction of the arrow, causes the mirror to be moved from the position shown in Fig. 1 to that shown in Fig. 2 and then to the position shown in Fig. 4, and finally its return to that shown in Fig. 1.

The shutter proper which causes the exposure is arranged in front of the exposure chamber 6 and is of the type shown in Patent No. 946,679. The essential parts of a shutter of this type are shown in Fig. 7 and also diagrammatically in Figs. 1ᵃ, 2ᵃ, 2ᵇ, 3ᵃ and 4ᵃ and embodies a series of pivoted shutter wings 20, the movements of which are controlled by an oscillatory, spring operated ring having a cam shaped projection 21 thereon which forms part of a latch connection between it and the end 22 of what may be termed a master member 23, pivoted at 24 in the casing and actuated in the direction of the arrow by a suitable operating spring such as 25. The other end 26 of the master member is adapted to coöperate with the inner end of the shutter operating and controlling member 27 pivoted at 28 and actuated in the direction of the arrow by a spring 29. There is also a latch connection between the inner end of this member 27 and the end 26 of the master member to permit yielding when moving in one direction. The construction and arrangement of these parts of the shutter are such that when the outer end of the member 27 is moved downward it will turn the master member on its pivot by reason of the engagement with the end 26 thereof and at the same time, the end 22 of the master member will slide over the projection 21 on the shutter-operating ring, said master member yielding laterally for this purpose and as the movement of the operating and controlling member 27 continues, the end 22 will drop past to the left of said projection 21 and when the inner end of the member 27 passes off the end 26 of the master member, the latter returning will operate the shutter ring clockwise, causing the opening of the shutter during its passage to normal position and just before it reaches normal position, pass out of contact with the projection 21, allowing the spring operated ring to close the shutter blades. This is the normal operation in making an instantaneous exposure in shutters of this type. It will be noted, however, that the disconnection of latch connection between the end 22 of the master member and the projection 21 on the shutter operating ring, precedes the release of the master member from the operating member 27 and as soon as the ring projection 21 is engaged, the master member and through it the blade ring may be controlled by the member 27 and by allowing the outer end of the member 27 to rise again, the master member will turn the shutter ring in a clockwise direction and open the shutter blades, retaining them in this position as long as the member 27 is prevented from moving in either direction. If, however, the member 27 is released, it will be returned by its spring to normal position, allowing the end 22 of the master member to slip off the projection 21 of the blade operating ring and permit the blades to close. It will be understood also that in the normal operation of the shutter, the complete downward movement of the operating and controlling member 27 will first turn the master member to cause the latch betweeen the end 22 and the projection 21 of the ring to assume operative connection and continued pressure will release the upper end of the master member, allowing the latter to rotate the shutter ring and open and close the shutter blades. I have thus described the characteristics of a shutter of this type and have referred to a patent showing such a shutter, but the details of the shutter itself form no part of my present invention. However, for illustrative purposes, I have indicated by lines a, b, c, d, in the Figs. 2ᵃ, 2ᵇ, 3ᵃ, etc., the positions assumed by an indicating line e on the operating and controlling lever 27 during the cycle of operations referred to, that is to say, when the index e coincides with an indication a, the shutter is ready to be operated. When it coincides with the line c (Fig. 2ᵃ) the latch between the master member of the shutter and the blade operating ring has become engaged and when the member 27 is allowed to move so that index e engages with the line b as in Fig. 2ᵇ, the blade ring will be operated by the master member and the shutter held open so long as the member 27 is restrained or held, but when it is released, it will move back to normal position, registering with the line a, as shown in Fig. 3ᵃ and when it is again operated into register with the line d, as shown in Fig. 4ᵃ, the shutter will be opened and closed, thus making an instantaneous exposure.

With the cycle of operations of the shutter understood, I will now describe the connection of this type of shutter to the reflex camera. The operating and controlling member 27 of the shutter is connected by a link 30 with the forward end of a lever 31 pivoted at 32 in the casing, said lever being operated by a spring 33 to hold a projection 34 thereon in contact with the surface of the cam plate 13. The cam plate 13 has two similar cam surfaces 35 and 36, the former extending from a point nearer the center of rotation gradually outward, radially, and terminating in a sharp shoulder extending toward the center both said surfaces operating to move the member 27 to position $a$. The other cam surface 36 has at the end a slight depression or dwell 37, the purpose of which will be explained. 40 indicates a stop lever pivoted at 41 to the casing having its outer end 42 extended to the exterior of the casing in convenient position to be operated and said lever is moved toward the cam by a spring 43 and is provided with a shoulder 44 with which a stop such as the wrist pin 12 on the cam is adapted to engage and by means of which the rotation of the cam plate and arbor is arrested.

The operation of the device will now be understood. The normal position of the parts is shown in Fig. 1 and the operator first turns the arbor 14 by means of the handle 15, rotating the cam plate 13 in the direction of the arrow, thereby moving the mirror downwardly to the position shown in Fig. 2. At the same time, the cam 36 moves the lever 31 downwardly against its spring, drawing the operating and controlling member 27 downwardly to the position shown in dotted lines in Fig. 2, the shutter member 27 then being in the position shown in dotted lines in Fig. $2^a$. As soon as the projection 34 on the lever 31 drops off the highest point of the cam and enters the dwell 37, the lever 31 moves upwardly allowing the member 27 to assume the position shown in Fig. $2^b$ which will open the shutter and the lever and member are retained in this position because at this time the wrist pin 12 is in engagement with the shoulder 44 on the lever 40 and the rotary movement of the arbor and cam plate is thereby absolutely arrested. In this position, the mirror is down and the image from the lens is thrown upon the focusing screen, all as shown in full lines in Fig. 2. When it is desired to make the exposure, it is only necessary to move the retaining stop 40 forward, the first portion of the movement, by reason of the incline on the stop shoulder 44 allowing the projection 34 on the lever 31 to move from the dwell 37 to the lowest portion of the cam, as shown in Fig. 3, and this allows the operating and controlling lever 27 to move to the position shown in Fig. $3^a$, closing the shutter. The continued movement of the release lever 40 allows the cam to be rotated by the spring 16 which then operates below the center of rotation, elevating the mirror, as shown in Fig. 4, and the cam surface 35 depresses the lever 31, drawing the shutter controlling member 27 downwardly, as shown in Fig. $4^a$, thereby setting and releasing the shutter and making an instantaneous exposure.

While I prefer to employ a rotary cam for operating and controlling the shutter, this may be considered a progressively movable part connected to the mirror and operated for a portion of its movement manually and for the balance by the spring 16.

I claim as my invention:

1. In a camera, a focusing screen, a movable mirror having a set position for reflecting a lens image on the screen, and an inoperative position for covering the latter, in combination with a lens shutter, a shutter operating and controlling member therefor whose continuous movement in one direction opens and closes the shutter and whose partial movement and retraction opens and holds the shutter open, a mirror operating member and operative connections between the members whereby the shutter member is moved and partially retracted when the mirror is moved to set position and fully retracted and operated when the mirror is in inoperative position.

2. In a camera, a focusing screen, a movable mirror having a set position for reflecting a lens image on the screen and an inoperative position for covering the latter, in combination with a lens shutter, an operating and controlling member therefor whose continuous movement in one direction opens and closes the shutter and whose partial movement and retraction opens and holds the shutter open, a member controlling the movements of the mirror movable intermittently in one direction, connections between the two members and a stop for controlling the movement of the mirror controlling member.

3. In a camera, a focusing screen, a movable mirror having a set position for reflecting a lens image on the screen, and an inoperative position for covering the latter and a progressively movable part for controlling the movement of the mirror in combination with a lens shutter comprising an operating and controlling member, a master member and latch connections between the operating and master members and also between the latter and the shutter blades, connections between the mirror controlling part and the shutter operating member for actuating and controlling the latter, and a stop for controlling the movement of the mirror controlling part.

4. In a reflecting focusing camera comprising a lens, a focusing screen, a movable mirror and a movable part for controlling its movements, in combination with a photographic shutter of the spring actuated type comprising a single operating and controlling member by the movement of which, alone, the shutter may be opened, retained open, then closed and finally opened and closed by spring action, and operating connections between the mirror moving parts and said member for coördinating their movements to open and hold the shutter open to focus through the lens, to close the shutter and then open and close the latter.

5. In a reflecting camera comprising a lens, a focusing screen, a movable mirror, a movable part controlling the mirror and a cam movable therewith, in combination with a shutter of the spring actuated type having a single operating and controlling member actuated from the cam to open and retain the shutter, then close it and finally to set and release the shutter allowing its spring to close it, and a manually operated stop for controlling the movement of the cam.

6. In a reflecting camera comprising a lens, a focusing screen, a movable mirror, in combination with a shutter of the spring actuated type having a single operating and controlling member adapted to open the shutter and retain it open, to close it and to cause it to be opened and closed by spring action, a cam connected to the mirror for controlling its movements and connections between the cam and the shutter operating and controlling member for causing the above recited cycle of operations, and a movable stop for controlling the movements of the cam.

7. A reflecting camera, comprising a lens, a focusing screen, a movable mirror, and a progressively movable cam, in combination with a spring actuated shutter comprising a single operating and controlling member, operative connections between the cam and member for controlling the movements of the latter for focusing and exposure. and a stop for controlling the movement of the cam.

8. A reflecting camera comprising a lens, a focusing screen, a movable mirror, and a rotary cam manually operable for a portion of its movement, and a spring for completing said movement, in combination with a spring actuated shutter comprising a single operating and controlling member, operative connections between the cam and mirror and between it and the shutter operating member, and a manually operative stop for controlling the movement of the cam.

9. A reflecting camera comprising a lens, a focusing screen, and a movable mirror in combination with a spring actuated shutter comprising a single operating and controlling member, a cam connected to the mirror and having two operating portions coöperating with the shutter member for causing its complete movement in one direction, and a portion permitting a partial movement in the other, a movable stop for arresting the movement of the cam when the member is partially moved to hold the shutter open.

10. A reflecting camera comprising a focusing screen and a movable mirror, in combination with a spring actuated shutter having a single operating and controlling member, a part connected to the mirror, and manually operable through a portion of its cycle of movement and a spring for completing its movement in the same direction, connections between said part and the shutter member for operating the latter in one direction twice during the complete movement of the former and arresting its return after one movement, and a movable stop for holding said part to prevent the complete return of said shutter member after one of said movements.

11. A reflecting camera comprising a focusing screen and a movable mirror, in combination with a spring actuated shutter having a single operating and controlling member, a rotary part connected to the mirror and manually operable through a portion of its cycle of movement, and a spring for completing its movement, said part having two similar portions coöperating with the shutter operating member to actuate it fully in one direction, and a portion to arrest its return after one operation, and a stop for arresting the movement of the part when said last mentioned portion is in coöperative relation with the member.

GEORGE I. KESTER.